US009618935B2

(12) United States Patent
Yang

(10) Patent No.: US 9,618,935 B2
(45) Date of Patent: Apr. 11, 2017

(54) REMOTE CONTROLLING AND LIFESAVING APPARATUS USING A WEARABLE DEVICE SYSTEM WITHIN A CAR

(71) Applicant: Sun Jong Yang, Seongnam-si (KR)

(72) Inventor: Sun Jong Yang, Seongnam-si (KR)

( * ) Notice: Subject to any disclaimer, the term of this patent is extended or adjusted under 35 U.S.C. 154(b) by 0 days.

(21) Appl. No.: 15/179,663

(22) Filed: Jun. 10, 2016

(65) Prior Publication Data

US 2016/0363931 A1    Dec. 15, 2016

(30) Foreign Application Priority Data

Jun. 11, 2015 (KR) .................. 10-2015-0082690

(51) Int. Cl.
| | | |
|---|---|---|
| G08B 25/00 | (2006.01) | |
| A61B 5/00 | (2006.01) | |
| G05D 1/00 | (2006.01) | |
| G07C 5/08 | (2006.01) | |
| G01S 19/13 | (2010.01) | |

(52) U.S. Cl.
CPC ............ *G05D 1/0016* (2013.01); *G01S 19/13* (2013.01); *G07C 5/0808* (2013.01)

(58) Field of Classification Search
None
See application file for complete search history.

(56) References Cited

U.S. PATENT DOCUMENTS

| | | | | |
|---|---|---|---|---|
| 2007/0290535 A1* | 12/2007 | Meredith | ........... | B60N 2/42736 297/217.1 |
| 2013/0267194 A1* | 10/2013 | Breed | ..................... | H04W 4/22 455/404.2 |
| 2014/0088827 A1* | 3/2014 | Yashiro | ..................... | B60L 1/00 701/36 |
| 2014/0306799 A1* | 10/2014 | Ricci | ....................... | B60Q 1/00 340/5.83 |
| 2015/0084757 A1* | 3/2015 | Annibale | ............... | G08B 25/10 340/436 |

(Continued)

FOREIGN PATENT DOCUMENTS

| | | |
|---|---|---|
| JP | 2006-005550 A | 1/2006 |
| KR | 10-2011-0114893 A | 10/2011 |
| KR | 10-1514255 B1 | 4/2015 |

OTHER PUBLICATIONS

Korean Final Office Action mailed Oct. 13, 2015, for corresponding Korean Application No. 10-2015-0082690.

(Continued)

*Primary Examiner* — Khoi Tran
*Assistant Examiner* — Ryan Rink
(74) *Attorney, Agent, or Firm* — Hauptman Ham, LLP

(57) ABSTRACT

A remote controlling and lifesaving apparatus using a wearable device system within a car is provided. The remote controlling and lifesaving apparatus using a wearable device system within a car performs lifesaving according to biometric information of a passenger when a car accident occurs, and provides technology for measuring biometric information of the passenger through the wearable device system when the car accident occurs and performing rapid post management for the passenger based on the measured biometric information.

9 Claims, 4 Drawing Sheets

(56) References Cited

U.S. PATENT DOCUMENTS

| | | | | |
|---|---|---|---|---|
| 2015/0127208 A1* | 5/2015 | Jecker | ............ | B62D 15/025 |
| | | | | 701/23 |
| 2015/0342542 A1* | 12/2015 | An | ............ | A61B 5/747 |
| | | | | 455/404.2 |
| 2015/0360617 A1* | 12/2015 | Schulz | ............ | B60R 11/04 |
| | | | | 701/41 |
| 2016/0086491 A1* | 3/2016 | Choi | ............ | G08G 1/205 |
| | | | | 340/425.5 |

OTHER PUBLICATIONS

Korean Final Office Action Decision of Refusal mailed Feb. 19, 2016, for corresponding Korean Application No. 10-2015-0082690.
Korean Notice of Allowance mailed May 19, 2016, for corresponding Korean Application No. 10-2015-0082690.

* cited by examiner

REMOTE CONTROLLING AND LIFESAVING APPARATUS USING A WEARABLE DEVICE SYSTEM WITHIN A CAR

CROSS-REFERENCE TO RELATED APPLICATIONS

The present application makes reference to, claims priority to, and claims the benefit of Korean Patent Application No. 10-2015-0082690, filed on Jun. 11, 2015, the contents of which are hereby incorporated herein by reference, in their entirety.

FIELD

The present invention relates to an apparatus of remotely controlling a car through a wearable device and receiving lifesaving center information of a car passenger to take post management based on the received lifesaving center information when an accident occurs, and more particularly, to provide a technology of notifying biometric information of the passenger and a car state which are received from an institution or an organization concerned with the accident to take rapid measurement after the accident.

BACKGROUND

The present invention relates to a remote controlling and lifesaving apparatus using a wearable device system within a car, and particularly, to a remote controlling and lifesaving apparatus using a wearable device system within a car to take rapid measures by calling a lifesaving center by using an information terminal mounted on a car receiving biometric information of a passenger wearing the wearable device system when the car accident occurs and then notifying the car accident to an institution or an organization concerned with the car accident.

The penetration rate of vehicles has rapidly increased since the commercialization after steam car at the end of the 19th century, and according to the report published by the National Statistical Office, it is said that the penetration rate of vehicles in Korea has already reached the level of advanced countries.

A car has already been an indispensable necessity in the modern society having a great characteristic of exchange of people, goods and information. In the world's major industrialized countries, car industry having the largest use rate of primary industry products has been promoted as a maximum basic industry and further, the car industry plays an important role in the economic front of each country. In addition, even in trades between countries, the car industry occupies a big part.

As such, cars car have become an important transportation means indispensable for modern men. However, in the limited land and complicated road networks and transportation systems, as the cars are continuously increased, inevitably, an increase in car accident rate is caused. As a result, thousands of people become victims of the car accident in a year and thus, an increase in cars and accidents are on the rise as a problem in the modern society.

As a method of reducing personal injury due to the car accident, there are many methods such as expanding road transportation networks and establishing systematic traffic order, but there is a limitation. Currently, when the car accident occurs, in the case of a light car accident, a driver calls a lifesaving car, a maintenance company, and the police by using a portable mobile phone and in the case of a heavy car accident enough not to use the mobile phone, another driver around the accident calls the lifesaving car.

However, such an accident management has no specific effectiveness at a place such as a quiet place or an expressway. Accordingly, when an emergency situation enough to cause personal injuries occurs, the rapid management for the accident is impossible and in many cases, the valuable life of the driver is lost, and the national loss is caused, and thus, a rapid management for the accident is required.

Recently, due to the advent of devices equipped with the wearable device system, countermeasures for the car accident by using the wearable device system operating in conjunction with the car have been discussed.

The wearable device system can operate in conjunction with devices and means a portable device and recently, is mainly constituted by a band form wearable on the wrist. Furthermore, the wearable device system includes a plurality of sensors that receives body information and has been used as a technology of determining whether the biometric information of the wearer wearing the wearable device system and the emergency situation occurs.

In the prior art of Korean Patent Application No. 10-2004-0069988 (hereinafter, Document 1), a system for processing a vehicle emergency situation by driving a terminal camera through a signal sensing an engine error and a sudden stop of the car to capture an image of an object is described.

However, in Document 1, there is a problem in that it is still difficult to perform a rapid accident management in response to the biometric information of the passenger.

BRIEF SUMMARY

The present invention has been made in an effort to provide a lifesaving apparatus which performs lifesaving according to biometric information of a passenger when a car accident occurs.

The present invention has also been made in an effort to provide a remote controlling and lifesaving apparatus using a wearable device system within a car by measuring biometric information of the passenger through the wearable device when the car accident occurs to take a rapid post management for the passenger based on the measured biometric information.

Objects of the present invention are not limited the aforementioned object and other objects and advantages of the present invention, which are not mentioned can be appreciated by the following description and will be more apparently know by the exemplary embodiments of the present invention. Further, the objects of the present invention may be implemented by means represented in the scope of the present invention and combinations thereof.

According to an aspect of the present invention, there is provided a remote controlling and lifesaving apparatus using a wearable device system within a car, comprising: a wearable device system receiving biometric information through a passenger wearing the wearable device system, performing remote controlling of the car, and displaying a warning and a state of a car; a car information terminal storing the biometric information, performing self-diagnosis of the car, transmitting a result of the diagnosis to the wearable device system, and determining whether a car accident occurs, by operating in conjunction with the wearable device system; an information service center as an institution and an organization concerned with the car accident which receives position information of the car, biometric information of the passenger, and state information of the car when the car accident occurs, by operating in conjunction with the car information terminal, in which the car information terminal includes a communication module configured to receive the state information of the car measured for performing self-diagnosis of the car and determining whether the accident occurs and communicate with the wearable device system and the information service center through a wireless communication network.

The remote controlling and lifesaving apparatus may further include a lifesaving center sending a lifesaving car to an accident site after attempting a voice call with the passenger in response to a call of the car information terminal, when the car accident occurs.

The car information terminal may further include a storage medium storing the measured state information of the car and the biometric information of the passenger measured in the wearable device system; and a controller performing self-diagnosis of the car through the received state information of the car, performing the control of the car by operating in conjunction with the wearable device system, and determining whether the car accident occurs.

The car information terminal may further include a GPS receiver calculating a position of the car by reading a satellite signal transmitted from a GPS satellite.

The car information terminal may determine whether the car accident occurs by operating in conjunction with a sensor positioned in the car.

The car information terminal may determine whether the car accident occurs by measuring vibration and impact of the car through a position sensor, a deceleration and acceleration sensor, an impact sensor, a gyroscope positioned in the car information terminal.

The car information terminal may be configured in an OEM form of the car.

The wearable device system may include a smart watch, a smart band, and an electronic device which are attached to the body of the passenger.

The wearable device system may perform remote control of a car based on the command by interlocking with the car information terminal and include a wireless startup of the car, a wireless air conditioning of the car, a wireless window opening and closing of the car, wireless audio and video systems of the car, and an automated parking system.

The communication module may include Bluetooth, WiFi, a near field communication (NFC) module, 2G/3G/4G/5G mobile communication connection, and a radio frequency (RF) communication method.

The present invention may have the following effects by connection of the above exemplary embodiments and configurations to be described below and a use relationship.

According to the present invention, it is possible to perform a wireless control of the car by using the wearable device system operating in conjunction with the car information terminal positioned in the car.

It is also possible to provide a lifesaving apparatus so as to receive biometric information of the passenger by operating in conjunction with the car information terminal positioned in the car and perform lifesaving activity and rapid post management based on the received biometric information of the passenger when the car accident occurs.

It is also possible to perform communication with a service center for the biometric information received from the wearable device system and a lifesaving center and perform a diagnosis optimized for a body of the passenger.

DETAILED DESCRIPTION

Hereinafter, examples of embodiments of the invention will be described in detail with reference to the accompanying drawings such that they can easily be made and used by those skilled in the art.

The present invention relates to a remote controlling and lifesaving apparatus through a wearable device system 10 within a car, and more particularly, to a technology of measuring biometric information of a passenger based on the wearable device system 10 worn by the car passenger to use the measured biometric information as data for post management when the car accident occurs.

The present invention also relates to a wireless control apparatus through the wearable device system 10 within the car to perform a behavior control of the car through wireless communication of the car operating in conjunction with the wearable device system 10.

The remote controlling and lifesaving apparatus includes a car information terminal 20 positioned in the car and the wearable device system 10 operating in conjunction with the car information terminal 20. In the case of the wearable device system 10 worn by the passenger, the remote controlling and lifesaving apparatus further includes an information service center 40 of notifying the car accident to an institution and a organization concerned with the car accident based on the biometric information of the passenger by operating in conjunction with the car information terminal 20, when the car accident occurs.

Figure 1:
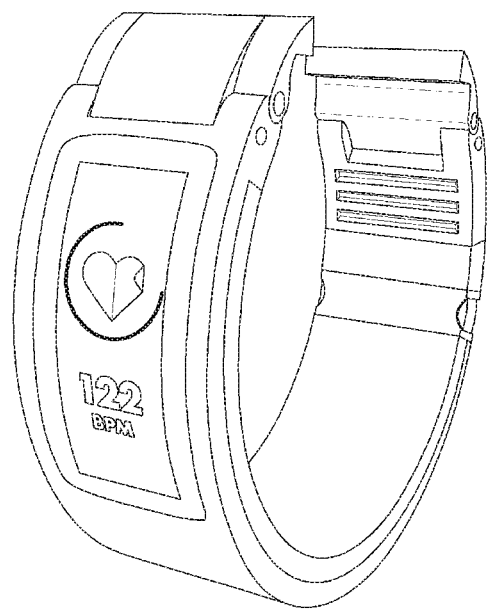
FIG. 1 illustrates a wearable device system of the present invention.

FIG. 1 illustrates a configuration of the wearable device system 10 of the present invention.

In an exemplary embodiment of the present invention, the wearable device system 10 may be constituted in a smart watch form. The smart watch provides a plurality of biometric information sensors 11 at a position which is in contact with the wearer's skin. More preferably, the plurality of biometric information sensors 11 may include a heart rate sensor, a blood glucose level sensor, a moisture sensor, and a plurality of sensors for measuring the biometric information.

In another exemplary embodiment of the present invention, the wearable device system 10 may be constituted in a band form. The wearable device system 10 constituted in the band form may include a constant display unit at a position facing the passenger. Through the display unit, an alert lamp for selection of self-diagnosis of the car, setting items for performing the wireless control of the car, warning problems occurring in the car, and maintenance of the car and the like may be displayed.

The display unit may be constituted in a beam project form, and constitute a project type screen at a body portion where the wearable device system 10 is positioned. More preferably, in the case of the wearable device system 10 located on the wrist, a display unit is constituted at a wrist portion or a palm portion to display the self-biometric information, select a command for wireless control of the car, and display a maintenance warning lamp of the car.

More preferably, a light emission diode (LED) warning unit is further included in addition to the display unit to allow the wearer to easily recognize a warning displayed on the wearable display.

The wearable device system 10 may be constituted by including a global positioning system (GPS), near field communication (NFC), WiFi, a Bluetooth module, a microprocessor, a RAM, a memory chip, a flash card memory device, 2G/3G/4G/5G mobile communication services including a SIM/USIM/micro SIM card slot, and the like.

Accordingly, the wearable device system 10 may use a wireless communication service using mobile communication and determine a position of an individual passenger by the GPS. Furthermore, the wearable device system 10 serves as a storage medium through the flash card memory device and the like and may store a command for performing the wireless control of the car.

Separately from this, the band type wearable device system 10 may be constituted by including a speaker positioned outside the wrist. The speaker generates noise in the situation where the accident occurs and may be used as a configuration for recovering consciousness of the passenger with the LED warning unit.

The wearable device system 10 may generate the noise or operate the LED warning for a lifesaving technician to easily identify the wounded passenger even when the passenger is separated from the car by the car accident and wounded.

As such, the wearable device system 10 is configured to easily perform consciousness recovery of an unconscious passenger and to locate the passenger separated from the car as well as a function of transmitting the biometric information of the passenger.

The wearable device system 10 provides a technology of receiving a warning by the wearable device system 10 when an unauthorized person breaks into the car or starts the car, by operating in conjunction with an antitheft device of the car. Further, the wearable device system 10 may perform a startup locking of an engine when receiving the antitheft warning and further includes a function of transmitting the theft situation to the information service center 40 and the lifesaving center 50.

As the exemplary embodiment of the present invention, the car trespassing of the unauthorized person may determine a theft situation such as an opened state of a car door in a closed state of the car, a startup after the door is opened in the closed state of the vibration sensor 30 and the closed state of the car, and the like. Further, as described above, the wearable device system 10 receiving the theft warning transmitted from the car according to the theft situation may perform a selective or integral control such as an off of the car engine, locking of the door, generating a warning sound of the car, and notifying the theft situation to the information service center 40 or the lifesaving center 50.

Figure 2:
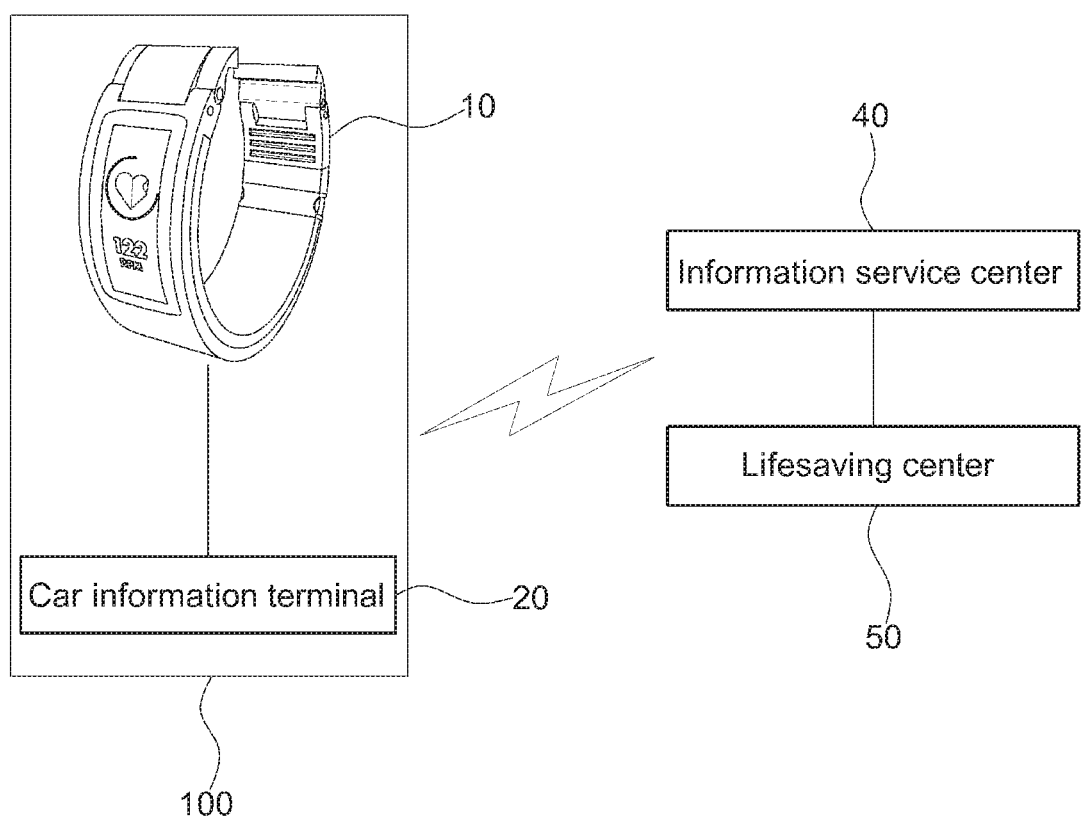
FIG. 2 illustrates a block diagram of a configuration of a remote controlling and lifesaving apparatus through a wearable device system of the present invention within a car.

FIG. 2 illustrates a configuration of the remote controlling and lifesaving apparatus through the wearable device system 10 of the present invention within a car.

As illustrated in FIG. 2, in an exemplary embodiment of the present invention, the remote controlling and lifesaving apparatus includes the wearable device system 10 which measures needs for the lifesaving of the passenger by contacting the body of the passenger.

The remote controlling and lifesaving apparatus is constituted by a car information terminal 20 which determines a car state and biometric information of the passenger through an interface with various devices in the car and the wearable device system 10, calculates information on a current position, a driving direction, and a driving speed of the car by analyzing a satellite signal transmitted from a global positioning system satellite through an embedded GPS receiver 24, calls the lifesaving center 50 by using the wireless communication module 21 when the car accident occurs, and provides position information of the car, state information of the car, and the like which are determined from the GPS satellite 60 signal by using the wireless communication module 21 to the information service center 40.

More preferably, the biometric information of the measured passenger, the state information of the car, the position information of the car, and the like are stored in the storage medium 23 as the configuration of the car information terminal 20. The information stored in the storage medium 23 may be transmitted to the information service center 40 if necessary.

The remote controlling and lifesaving apparatus includes computer terminals of various institutions and organizations concerned with the car accident such as police, insurance companies, and car repair shops and an information service center 40 which is connected with the computer terminals of various institutions and organizations through a communication network to provide car information provided from the car information terminal 20 and provide a road situation and the like to the car information terminal mounted on the car.

When constituting the lifesaving center 50, the lifesaving center 50 sends a lifesaving car to a current site of the accident car provided from the information service center 40. Furthermore, the lifesaving center 50 may include hospitals or 119 rescuers which rush the lifesaving car.

Figure 3:
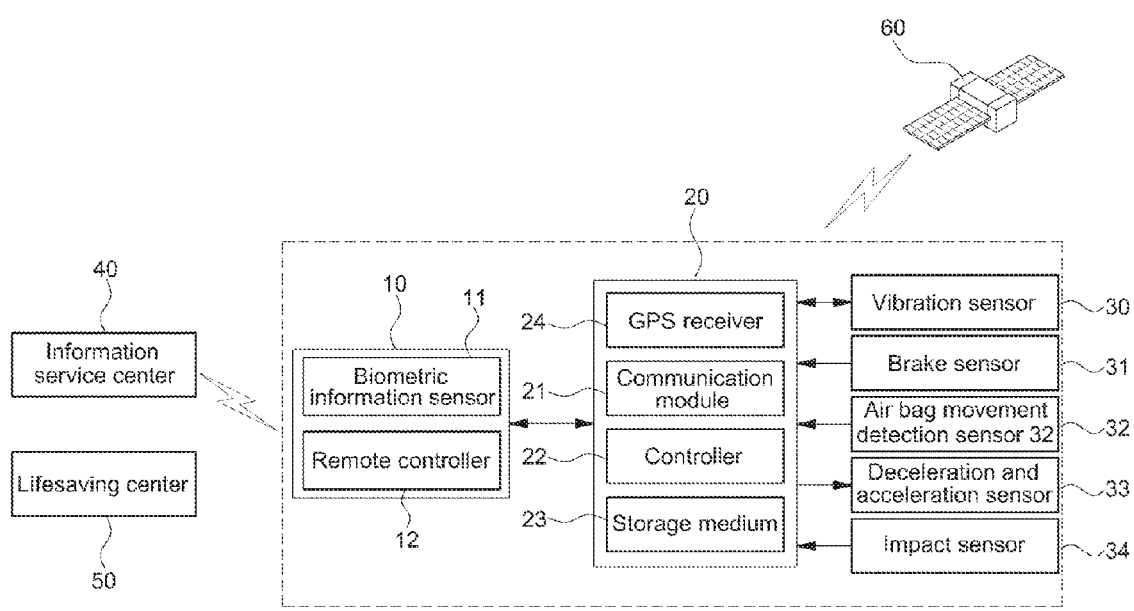
FIG. 3 illustrates a block diagram of a module configuration of a wearable device system and a car information terminal of the present invention.

FIG. 3 illustrates a module constituting the car information terminal 20 of the present invention.

The car information terminal 20 includes all of configurations which may be installed and released in an OEM form in the step of producing a car or installed outside after releasing the car. Further, the car information terminal 20 may include a 9-axis motion sensor, an accelerator sensor, a gyroscope, an impact sensor 34, a global positioning system (GPS), near field communication (NFC), WiFi, a Bluetooth module, a microprocessor, a RAM, a memory chip, a flash card memory device, 2G/3G/4G/5G mobile communication services including a SIM/USIM/micro SIM card slot, and the like.

In the exemplary embodiment of the present invention, the car information terminal 20 may be installed after releasing the car. The car information terminal 20 may receive a measuring value measured in a plurality of sensors positioned in the car by operating in conjunction with an electronic control unit (ECU) as a higher controller of the car and perform bidirectional communication with the ECU of the car to transmit and receive a control command of the car. More preferably, the car information terminal 20 and the controller of the car may perform bidirectional communication through CAN communication.

The car information terminal 20 includes a communication module 21 and the communication module 21 may operate in conjunction with the wearable device system 10 through wireless communication or wired communication. Furthermore, the car information terminal 20 may further include a GPS receiver 24 in order to analyze position information and a path of the car and calculate an accumulated mileage.

The communication module 21 includes Bluetooth, WiFi, near field communication (NFC), 2G/3G/4G/5G mobile communication connection, and a radio frequency (RF)

communication method, and the like so that the wearable device system 10 operates in conjunction with the car information terminal 20 or communication between the car information terminal 20 and the information service center 40 is enabled.

The car information terminal 20 constituted above may receive a remote control command of the car from the car information terminal 20 through the wearable device system 10 by operating in conjunction with the wearable device system 10 and transmit the received command to ECU as the higher controller of the car to control each component of the car. More preferably, the remote controller 12 of the wearable device system 10 performs the remote control of the car according to the stored command and may control a wireless startup of the car, a wireless air conditioning of the car, a wireless window opening and closing of the car, wireless audio and video systems of the car, an automated parking system, and the like.

The car information terminal 20 may be connected to a car body through an on board diagnosis (OBD) terminal of the car and perform a warning lamp of the car and a car self-diagnosis. Accordingly, the car information terminal 20 may perform the car self-diagnosis and a function of displaying the diagnosed result through the display of the wearable device system 10 by operating in conjunction with the wearable device system 10. Furthermore, the car information terminal 20 including the GPS receiver 24 measures a driving path of the car, calculates an approximate distance of the driving path, and may perform a function of easily providing maintenance of the car by reminding an oil replacement cycle, a break pad replacement cycle, a tire replacement cycle, and the like of the car through the calculated path distance.

In yet another exemplary embodiment of the present invention, the car information terminal 20 positioned in the car may be included and constituted by an original equipment manufacturing (OEM) form of the car. The car information terminal 20 constituted above may serve as a controller of the car. Accordingly, the car information terminal 20 constituted by operating in conjunction with the wearable device system 10 includes a configuration in which a user selects a command stored in the wearable device system 10 or the car information terminal 20 and controls the car based on the received command. More preferably, the remote controller 12 of the wearable device system 10 performs the remote control of the car according to the stored command and may control a wireless startup of the car, a wireless air conditioning of the car, a wireless window opening and closing of the car, wireless audio and video systems of the car, an automated parking system, and the like.

The car information terminal 20 may include a separate vibration sensor 30 and an impact sensor 34 capable of measuring vibration and impact of the car. The plurality of sensors may include all of sensors installed in the car, and according to a preferred exemplary embodiment of the present invention, may include a vibration sensor 30, an air bag movement detection sensor 32, a position sensor, a brake sensor 31, a deceleration and acceleration sensor 33, an impact sensor 34, a gyroscope, and the like.

The vibration and the impact of the car may be measured through a separate sensor positioned in the car information terminal 20, and in still another exemplary embodiment of the present invention, the plurality of sensors may include a vibration sensor 30, a position sensor, a deceleration and acceleration sensor 33, an impact sensor 34, a gyroscope, and the like which are positioned in the car information terminal 20.

The car information terminal 20 may determine whether a car accident occurs through the configuration of the sensor capable of measuring the vibration and the impact of the car. More preferably, the controller 22 of the car information terminal 20 determines the car accident when the measuring value of the sensor measured in the car and the car information terminal 20 is larger than predetermined vibration and impact.

The car information terminal 20 may turn on a speaker warning sound or an LED warning lamp in the car information terminal 20 when it is determined that the car accident occurs and perform a function of notifying the position of the accident and preventing loss of consciousness by turning on the speaker or the light installed in the car.

Figure 4:
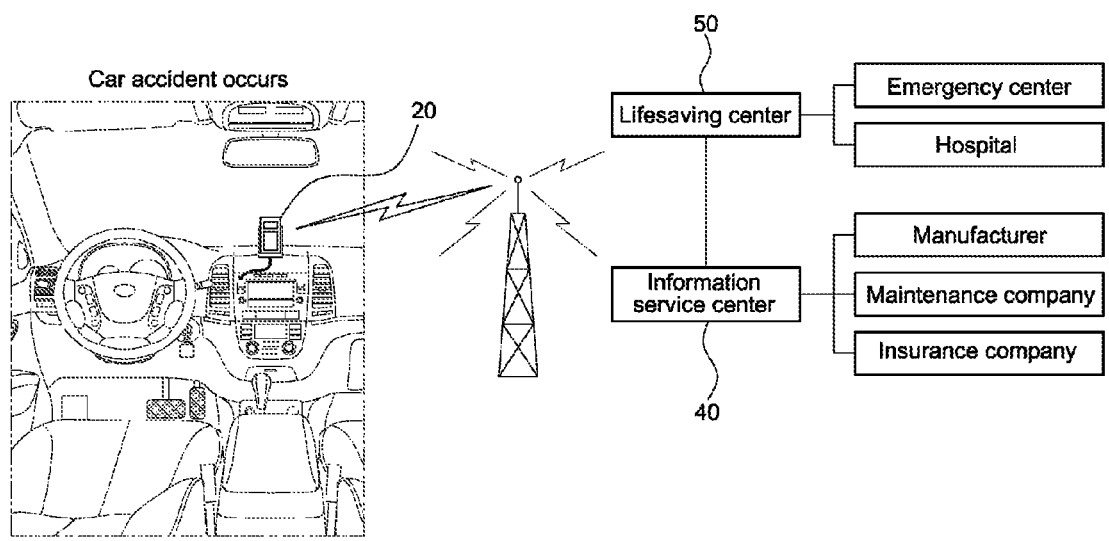
FIG. 4 illustrates a communicating process of the remote controlling and lifesaving apparatus through the wearable device system of the present invention within the car, when a car accident occurs as an exemplary embodiment of the present invention.

FIG. 4 illustrates a connection configuration of the lifesaving apparatus through wireless communication according to the car accident as an exemplary embodiment of the present invention.

In the exemplary embodiment of the present invention, when the impact is applied to a bumper of the car, the impact is input to a higher controller of the car or the car information terminal 20 through the impact sensor 34 attached to the car. When the input measured value is compared with a reference value which is predetermined in the controller 22 of the car information terminal 20, if the measured value is larger than the reference value, the controller 22 of the car information terminal 20 determines the occurrence of a car accident.

When the controller 22 of the car information terminal 20 determines the car accident, biometric information of the passenger, state information of the car, position information, and the like which are stored in the storage medium 23 may be transmitted to the information service center 40.

The information service center 40 receives the information stored in the storage medium 23 and determines the severity of the accident based on the received information. Additionally, the car information terminal 20 transmits the information stored in the storage medium 23 to the lifesaving center 50, and the lifesaving center 50 rushes the lifesaving car to a current position of the accident car provided from the information service center 40. More preferably, the lifesaving center 50 may include hospitals or 119 rescuers including the lifesaving car.

The lifesaving center 50 attempts a voice call with the passenger before rushing the lifesaving car, and the voice call may use a voice call system positioned in the car information terminal 20 or a communication network mounted on the wearable device system 10.

As such, the information service center 40 is in contact with a maintenance company and the like while reporting the accident to the insurance company to be joined by the accident car to perform post management for the accident in real time. Further, based on the biometric information of the passenger received by the wearable device system 10, when the injury of the passenger is confirmed, the information service center 40 receives the biometric information of the passenger by working in conjunction with the lifesaving center 50 constituted by hospitals and emergency centers and may perform rapid diagnosis and treatment for the accident.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A remote controlling and lifesaving apparatus using a wearable device system within a car, comprising:
the wearable device system configured to receive biometric information through a passenger wearing the wearable device system, configured to perform remote control of a car, and configured to display a warning and a state of the car;
a car information terminal configured to store the biometric information, configured to perform self-diagnosis of the car, configured to transmit a result of the diagnosis to the wearable device system, and configured to determine whether a car accident occurs, by operating in conjunction with the wearable device system; and
a computer terminal of at least one of an information service center, an institution or an organization concerned with the car accident which receives position information of the car, the biometric information of the passenger, and the state information of the car when the car accident occurs, by operating in conjunction with the car information terminal,
wherein the car information terminal includes a communication module,
wherein the communication module is configured to receive processed state information of the car measured for performing self-diagnosis of the car and determining whether the car accident occurs, and configured to communicate with the wearable device system and the information service center through a wireless communication network,
wherein the wearable device system is configured to perform wireless communication with the communication module, and includes a display unit configured to display self-diagnosis selection of the car, an error occurrence warning of the car, biometric information of the passenger, and maintenance warning of the car,
wherein the wearable device system is configured to perform the remote control of a car based on a command by operating in conjunction with the car information terminal,
wherein the remote control comprises a controlling of startup of the car, a controlling of air conditioning of the car, a controlling of window opening and closing of the car, a controlling of audio and video systems of the car, and a controlling of an automated parking system, and
wherein the display unit is a projection type display configured to project an image at a predetermined position.

2. The remote controlling and lifesaving apparatus according to claim 1, further comprising:
a computer terminal of a lifesaving center configured to send a lifesaving car to an accident site after attempting a voice call with the passenger in response to a call from the car information terminal, when the car accident occurs.

3. The remote controlling and lifesaving apparatus according to claim 1, wherein the car information terminal further includes: a storage medium storing the measured state information of the car and the biometric information of the passenger measured in the wearable device system; and a controller performing self-diagnosis of the car through the received state information of the car, performing control of the car by operating in conjunction with the wearable device system, and determining whether the car accident occurs.

4. The remote controlling and lifesaving apparatus according to claim 1, wherein the car information terminal further includes a GPS receiver calculating a position of the car by reading a satellite signal transmitted from a GPS satellite.

5. The remote controlling and lifesaving apparatus according to claim 1, wherein the car information terminal determines whether the car accident occurs by operating in conjunction with a sensor positioned in the car.

6. The remote controlling and lifesaving apparatus according to claim 1, wherein the car information terminal determines whether the car accident occurs by measuring vibration and impact of the car through a position sensor, a deceleration and acceleration sensor, an impact sensor, and a gyroscope positioned in the car information terminal.

7. The remote controlling and lifesaving apparatus according to claim 1, wherein the car information terminal is constituted by an original equipment manufacturing (OEM) form of the car.

8. The remote controlling and lifesaving apparatus according to claim 1, wherein the wearable device system includes a smart watch, a smart band, and an electronic device which are attached to the body of the passenger.

9. The remote controlling and lifesaving apparatus according to claim 1, wherein the communication module includes a near field communication (NFC) module, 2G/3G/4G/5G mobile communication connection, or a radio frequency (RF) communication method.

* * * * *